United States Patent Office
2,732,906
Patented Jan. 31, 1956

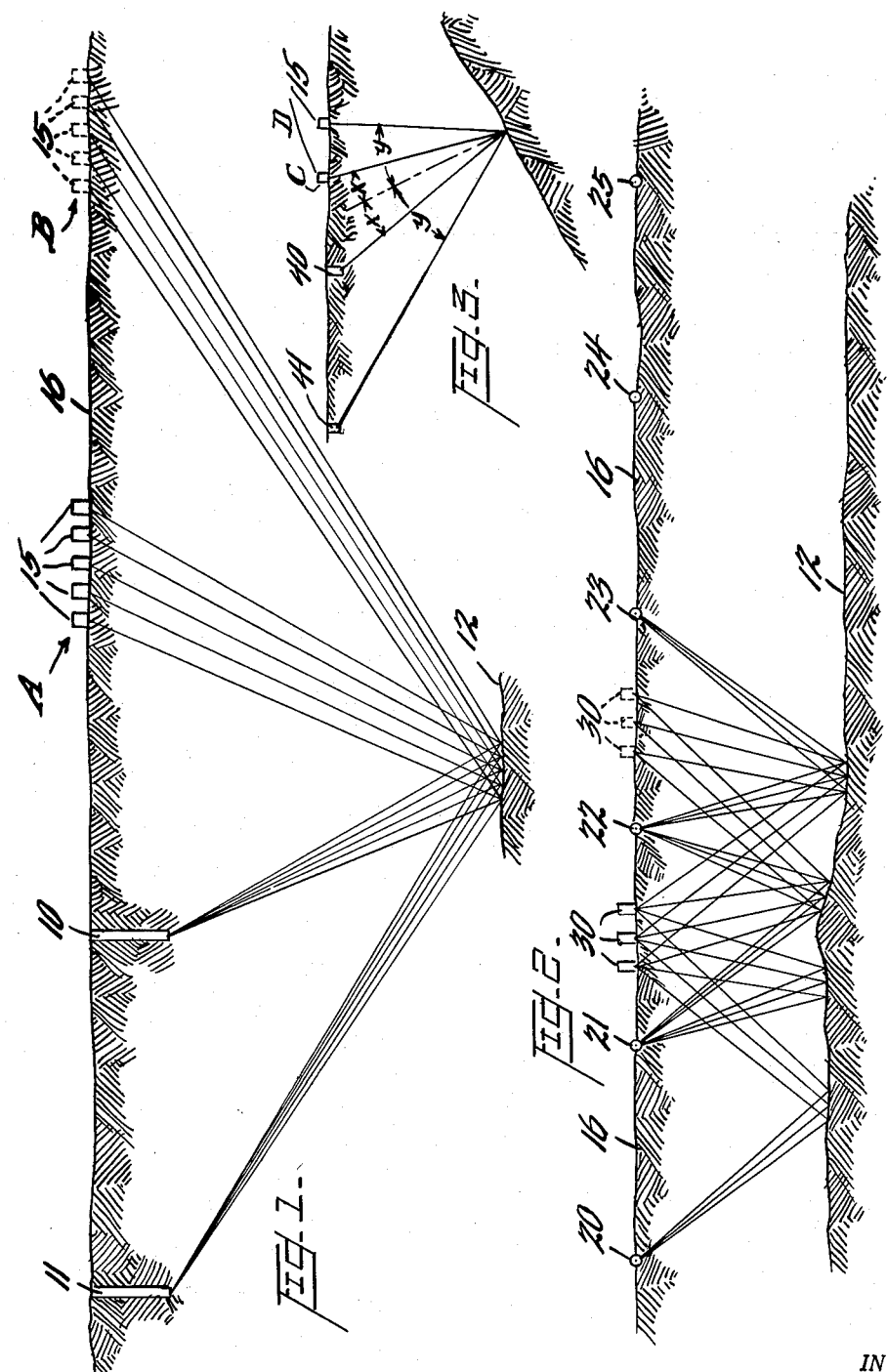

2,732,906
SEISMIC SURVEYING

William Harry Mayne, San Antonio, Tex., assignor to Olive S. Petty, San Antonio, Tex.

Application July 7, 1950, Serial No. 172,592

4 Claims. (Cl. 181—.5)

This invention relates to an improved method for conducting geophysical studies of the type wherein an artificial shock is imparted to the earth and the seismic waves thereby propagated are received, after reflection from various strata interfaces or sub-surface beds, by one or more seismometers, the received seismic energy being suitably amplified and recorded. The principal object of the invention is the provision of a method whereby the energy reflected from sub-surface beds may be emphasized and undesired or random energy may be reduced to a minimum in the final record.

In an effort to achieve reduction in amplitude of unwanted energy in the production of seismic records it is a common expedient to combine or composite the output of several seismometers on the theory that random energy seldom arrives at the different seismometers in phase. The patent to Parr, No. 2,348,409, granted May 9, 1944, illustrates a method and apparatus for compositing energy in a manner which has proved highly useful under some conditions. It will be appreciated, however, that these prior methods contemplate the combining or compositing of energy reflected from different areas on the same sub-surface bed, since the path of travel of the energy from any given propagation point or shot point to two or more spaced seismometers inevitably follows different paths. This is true even though the seismometers be arranged in an arc of a circle having the shot point at its center, since each seismometer then receives energy reflected from a different point on an arc of less radius located on the sub-surface bed; the reflections so composited are not derived from a single point or reflecting area on the bed, but from a series of separated points or areas. In the event the bed is irregular or is not horizontal, compositing in such a way as to ensure algebraic combination of the reflected energy at the several seismometers cannot be achieved by this method.

It is therefore proposed by the present invention to detonate two or more explosive charges in succession, the seismometers and shot points being so relocated, in the intervals between firing, that the energy propagated by each of the several explosions travels a different path but is reflected from the same point or limited area on the same sub-surface bed. The energy received on the successive shots is then combined in such a way as to compensate for the difference in travel time resulting from the change in location of the seismometers and shot points, whereby the reflected energy will be combined algebraically. The undesired energy, being unrelated in phase and distribution will be correspondingly minimized.

More specifically, it is proposed to locate a seismometer and an explosive charge in horizontally spaced relation at or near the earth's surface, to explode the charge and receive at the seismometer the energy reflected upwardly from a point or small area on a sub-surface bed, to repeat this procedure after relocating both the seismometer and the charge in a different horizontally spaced relation but substantially equi-distant from the initial reflecting point or area, and finally to produce a record which represents an algebraic combination of the energy received from the two explosives. It will be appreciated that the relative positions of the seismometer and shot point in the practice of this method are not important provided the location is such that the energy propagated on successive explosives is reflected from the same point or area on the sub-surface bed.

The invention also contemplates the application of this principle to conventional methods of continuous profiling of sub-surface strata as well as to other known procedures for conducting surveys over an extended area.

Further objects and features of the invention will be apparent from the following description of the accompanying drawings, in which Figure 1 is a diagrammatic representation of a simple procedure employing the principle of the invention, Figure 2 illustrates the application of the invention to one of the more conventional systems of continuous profiling, and Figure 3 represents the application of the method of Figure 1 to a survey of a bed having a pronounced dip.

In order to facilitate an understanding of the invention, specific language is employed in describing the embodiments thereof selected for the purpose of illustration in the accompanying drawing. It will be understood, however, that no limitation of the scope of the invention is thereby intended, such various further applications of the invention being contemplated as would normally occur to those skilled in the art to which the invention relates.

In Figure 1 is shown a simple method of practicing the invention; in the interest of clarity, the effect of firing only two shots is represented and only one interface or sub-surface bed is shown. Thus in the first step of the method, the explosive charge detonated in shot hole 10 propagates seismic energy in all directions, and a part of this energy is reflected upwardly from sub-surface bed 12 to seismometers 15, the latter being located at A in horizontally spaced relation to shot hole 10 in the vicinity of the surface 16. The approximate path traversed by the energy which is reflected and received at each of the several seismometers is illustrated.

The seismometers 15 are then removed to B, and shot hole 11 is used for wave propagation, it being noted that the seismometers and the shot hole are still substantially equi-distant from a point intermediate the initial location of the shot point and seismometers, as represented in the upper half of Figure 1. Consequently the energy transmitted to each of the several seismometers impinges on the sub-surface bed 12 at approximately the same point as in the firing of the first shot, and except for the greater lapse of time between the instant of detonation and the instant of reception of the reflected energy, the received signals should correspond. Thus when the received energy derived from the two shots is properly combined, the reflected energy will be reinforced whereas random energy, being non-coincident, will be relatively de-emphasized, and the clarity of the resulting record accordingly improved.

The method of combining the energy received from successive shots may vary widely. Thus the composite record may be made with the aid of drafting instruments designed to facilitate the recording of the algebraic sum of the instantaneous amplitudes of the traces produced by separately recording the several shots in the conventional manner. Various types of integrating machines may be used or instruments of the character shown in the patent to Ellis, No. 2,243,730, granted May 27, 1941, may be effectively employed.

Turning now to Figure 2 of the drawing, in which is represented the application of the invention to a system of continuous profiling, there are represented at 20 to 25 inclusive a series of shot points, a series of seismometers 30 being shown between shot points 21 and 22, the seismometers and shot points being located at the earth's surface 16 as in Figure 1. While the seismometers are in the illustrated position, charges are successively fired at shot points 20, 21, 22, and 23. The seismometers 30 are then moved to a position intermediate shot points 22 and 23, and successive charges are detonated at shot points 21, 22, 23, and 24. The seismometers 30 are then positioned intermediate shot points 23 and 24, and successive charges are detonated at shot points 22, 23, 24, and 25. This procedure may be continued indefinitely to complete the profile, the energy received on each shot being suitably amplified and recorded.

As will be noted from the illustrated paths followed by the reflected energy, the effect is essentially the same as that obtained by the simpler process of Figure 1, each point or area on the reflecting bed serving as a reflecting surface for at least two shots to reflect energy to the same seismometer. The traces representing such energy are then combined algebraically, as described in connection with Figure 1, to augment the effect on the final record of the reflected as distinguished from the undesired and random energy.

While only one sub-surface bed is shown and described to avoid confusion, it will be understood that energy is reflected upwardly from each interface on each shot to provide a succession of relatively high amplitude peaks on the record trace produced from the output of each seismometer. When two records representing energy reflected from the same area on a given sub-surface are combined algebraically, the peaks representing the arrival times of energy reflected from each of a number of sub-surface beds will be reinforced as hereinbefore described. Similar combination of energy received from more than two shot points may readily be effected, it being understood that reference herein to the combination of energy from two explosions is intended to embrace either two or a greater number.

In the embodiments illustrated in Figures 1 and 2, it is assumed that the sub-surface bed is substantially horizontal. Consequently the shot point and seismometer are represented as spaced at the same distance from an intermediate point on the firing of the successive shots. In Figure 3 the sub-surface bed is sharply inclined, and the surface relationship is therefore different, but the angles of incidence and reflection are still, of course, equal. Thus the first shot is fired at 40, and the second at 41, the respective seismometer locations being at C and D. The dotted line represents a normal to the sub-surface area at the common reflection point, the angles X on the first shot and the angles Y on the second shot being equal. This relation is invariably established whether the reflecting sub-surface be horizontal or dipped.

Having thus described the invention, what is claimed as new and desired to be secured by Letters Patent is:

1. In a method of seismic surveying, the steps which comprise locating a seismometer and an explosive charge in horizontally spaced relation near the surface of the earth, exploding the charge, and receiving at the seismometer the seismic energy propagated by the explosion and reflected upwardly from an intermediate area on a sub-surface bed, relocating the seismometer and a second explosive charge in a different horizontally spaced relation at points so located that energy propagated by the second charge will travel a path of different length but will be reflected to the seismometer from the same intermediate area on the said sub-surface bed, firing the second charge, and receiving at the seismometer the seismic energy propagated by the second explosive charge and reflected upwardly from the same intermediate area on the said sub-surface bed, and recording an algebraic combination of the energy received from the two explosions.

2. In a method of seismic surveying, the steps which comprise locating a seismometer and an explosive charge in horizontally spaced relation near the surface of the earth, exploding the charge, and receiving at the seismometer the seismic energy propagated by the explosion and reflected upwardly from an intermediate area on a sub-surface bed, relocating the seismometer and a second explosive charge in a different horizontally spaced relation at points so located that energy propagated by the second charge will travel a path of different length but will be reflected to the seismometer from the same intermediate area on the said sub-surface bed, firing the second charge, and receiving at the seismometer the seismic energy propagated by the second explosion and reflected upwardly from the same intermediate area on the said sub-surface bed, recording the received energy propagated by each explosion, and combining the records to produce a final record in which the arrival time of reflected energy is correspondingly reinforced.

3. In a method of seismic surveying, the steps which comprise locating a plurality of seismometers and an explosive charge in horizontally spaced relation near the surface of the earth, exploding the charge, and receiving at the several seismometers the seismic energy propagated by the explosion and reflected upwardly from an intermediate area on a sub-surface bed, relocating the seismometers, firing a second explosive charge in a different spaced relation to the seismometers but at a point so located that energy propagated by the second charge will travel a path of different length but will be reflected to the seismometer from the same intermediate area on the said sub-surface bed, receiving at the seismometers the seismic energy propagated by the second explosion and reflected upwardly from the same intermediate area on the said sub-surface bed, and recording an algebraic combination of the energy received at each seismometer from the two explosions.

4. In a method of seismic surveying, the steps which comprise locating a series of equi-distant shot points in a straight line, locating at least one seismometer intermediate two adjacent shot points, firing an explosive charge successively at each of the two shot points nearest the seismometer on each side of the latter, relocating the seismometer in successive positions intermediate other adjacent shot points, firing an explosive charge successively at each of the two shot points nearest the seismometer on each side of the latter following each relocation of the seismometer, amplifying and recording the energy received by the seismometer on the firing of each charge, and so combining the records by compositing a trace from one record with a trace from another record that the energy reflected from the same sub-surface area having travel paths of different length and produced by the firing of charges at different shot points is in substantial coincidence.

References Cited in the file of this patent

UNITED STATES PATENTS

| | | |
|---|---|---|
| 2,024,921 | Green | Dec. 17, 1935 |
| 2,216,452 | Owen | Oct. 1, 1940 |
| 2,305,383 | Hoover, Jr., et al. | Dec. 15, 1942 |
| 2,321,450 | Athy et al. | June 8, 1943 |
| 2,331,080 | Petty | Oct. 5, 1943 |
| 2,539,220 | Athy et al. | Jan. 23, 1951 |
| 2,555,806 | Mitchell, Jr. | June 5, 1951 |
| 2,580,636 | Wolf | Jan. 1, 1952 |